(12) United States Patent
McElvain

(10) Patent No.: US 8,729,922 B2
(45) Date of Patent: *May 20, 2014

(54) LICENSING PROGRAMMABLE HARDWARE SUB-DESIGNS USING A HOST-IDENTIFIER

(75) Inventor: Kenneth S. McElvain, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/180,474

(22) Filed: Jul. 11, 2011

(65) Prior Publication Data

US 2011/0267095 A1 Nov. 3, 2011

Related U.S. Application Data

(62) Division of application No. 10/956,327, filed on Sep. 30, 2004, now Pat. No. 7,987,373.

(51) Int. Cl.
*G06F 21/00* (2013.01)

(52) U.S. Cl.
USPC .............. 326/8; 726/21; 716/100; 705/901; 713/189

(58) Field of Classification Search
USPC ................................... 326/8; 726/21
See application file for complete search history.

(56) References Cited

U.S. PATENT DOCUMENTS

| | | | |
|---|---|---|---|
| 6,357,037 B1 | 3/2002 | Burnham et al. | |
| 6,748,368 B1 * | 6/2004 | Trimberger et al. | 705/500 |
| 6,904,527 B1 | 6/2005 | Parlour et al. | |
| 7,107,567 B1 * | 9/2006 | LeBlanc | 716/106 |
| 7,183,799 B1 * | 2/2007 | Donlin et al. | 326/38 |
| 2001/0015919 A1 | 8/2001 | Kean | |
| 2002/0150252 A1 * | 10/2002 | Wong | 380/277 |
| 2002/0199110 A1 | 12/2002 | Kean | |
| 2003/0126059 A1 | 7/2003 | Hensley et al. | |
| 2003/0126450 A1 | 7/2003 | Master et al. | |
| 2003/0140255 A1 | 7/2003 | Ricchetti et al. | |
| 2004/0117644 A1 | 6/2004 | Colvin | |
| 2004/0133794 A1 | 7/2004 | Kocher et al. | |
| 2005/0097055 A1 * | 5/2005 | Kanamori et al. | 705/51 |

OTHER PUBLICATIONS

JP Application No. 2007-534713, Decision for Final Rejection, Dispatch Date Jul. 11, 2011, 13 pages.

(Continued)

*Primary Examiner* — Hadi Armouche
*Assistant Examiner* — Bryan Wright
(74) *Attorney, Agent, or Firm* — Blakely, Sokoloff, Taylor & Zafman LLP; Judith A. Szepesi

(57) ABSTRACT

Methods and apparatuses for enforcing terms of a licensing agreement between a plurality of parties involved in a particular hardware design through the use of hardware technologies. According to one embodiment, a hardware sub-design includes a license verification sub-design that is protected from user modification by encryption. In one embodiment, a license is generated based on a trusted host identifier within an external hardware device. In one embodiment, each trusted host identifier is unique, and no two integrated circuits share the same trusted host identifier. In another embodiment, the integrated circuit is a field programmable gate array or an application specific integrated circuit. In one embodiment, a license determines how long the hardware sub-design will operate when the hardware sub-design is implemented within an integrated circuit having a trusted host identifier.

26 Claims, 12 Drawing Sheets

(56) References Cited

OTHER PUBLICATIONS

KR Application No. 2007-7009489, Notice of Grounds for Rejection, Issuance Date Feb. 2, 2012, 9 pages.
English translation of the Japanese Office Action for counterpart application No. JP2007-534713, dated Oct. 4, 2010, and the English translation of the claims of the counterpart application, 9 pages.
Kean, Tom, "Cryptographic Rights Management of FPGA Intellectual Property Cores," FPGA Feb. 2002, 7 pages.
Kean, Tom, "Cryptographically Enforced Pay-Per-Use Licensing of FPGA Design Intellectual Property," IP Based Sock Design 2002, Oct. 2002, 5 pages.
PCT International Preliminary Report and Written Opinion for PCT International Appln. No. PCT/US2005/034637, mailed Apr. 12, 2007, 12 pages.
PCT International Search Report and Written Opinion for PCT Appln No. US2005/034637, mailed Jan. 30, 2006, 14 pages.
Examination Report for counterpart European Application: EP 05 799 672.0, dated Jan. 1, 2013, 3 pages.
Appeal Decision for counterpart Japanese Application: 2007-534713, 14 pages.

\* cited by examiner

LICENSING PROGRAMMABLE HARDWARE SUB-DESIGNS USING A HOST-IDENTIFIER

RELATED APPLICATIONS

The present application is a divisional of U.S. application Ser. No. 10/956,327, filed on Sep. 30, 2004.

FIELD OF THE INVENTION

The present invention relates generally to the field of designing integrated circuits, and more particularly to hardware technologies for enforcing terms of a licensing agreement between a plurality of parties involved in a particular hardware design.

BACKGROUND OF THE INVENTION

The design of complex hardware systems involves a combination of creating new hardware sub-designs (e.g., portions of a proprietary hardware design code and supporting documentation) from scratch and purchasing hardware sub-designs that are prepared by an IP block owner. In many cases, a designer purchases hardware sub-designs from an IP block owner (e.g., organizations/persons which own the intellectual property rights to hardware sub-designs) rather than develop a particular hardware sub-design internally. IP block owners face several challenges in licensing and maintaining control of their intellectual property (e.g., hardware sub-designs). One of the biggest challenges is the unauthorized use of and lack of effective ways of licensing hardware sub-designs on a per use basis. Unfortunately, FPGAs (field-programmable gate arrays) and ASICs (application specific integrated circuits) do not have any trusted and fixed unique identifiers, and as a result hardware sub-designs cannot be easily be licensed on a per use basis. (e.g., a per use license would require an accounting of every device a particular hardware sub-design is implemented on, and a lack of trusted unique identifiers makes it difficult to peg a particular license to a particular FPGA). Instead, IP block owners must often sell global onetime licenses (e.g., a global one-time license to use a particular hardware sub-design on any and all FPGAs at a designer) unless the IP block owner trusts (e.g., through a long standing business relationship) that a designer will properly account for and pay for each use of the hardware sub-design. Furthermore, rampant theft pervades the industry because of a lack of ways to track where hardware sub-designs are copied and applied (e.g., once a hardware sub-design is sold, an IP block owner is unable to monitor and determine how many instances of a particular hardware sub-design were made on FPGAs). Thus, IP block owners are unable to maximize their leverage of intellectual property rights in hardware sub-designs, and are unable to control where their hardware sub-designs are ultimately utilized.

FIG. 1A illustrates a FPGA 118 having a plurality of IP blocks 110A-110I. The FPGA 118 is coupled to designer 111 through bus 108. A designer 111 (e.g., a person or company who is creating a hardware system) transfers hardware sub-designs (e.g., the designer 111 may reuse a particular hardware sub-design that was previous created by the designer 111, may develop a custom design, may use a design in the public domain, or may use a design purchased from or created by a third party IP block owner) to the FPGA 118 through bus 108 (e.g., the designer 111 may transfer a representation of the design to the FPGA 118 to program one or more IP blocks 110A-110I and/or the designer's logic 150).

The FPGA 118 includes a designer's logic 150 and a plurality of IP blocks 110A-110I. The designer's logic 150 includes hardware sub-designs that have been created by a designer 111. Each IP block 110A-110I within FPGA 118 includes a hardware sub-design that has been purchased from a third-party. (e.g., the hardware sub-design within a particular IP block 110A may be purchased from a third party IP block owner 100 as illustrated in FIG. 1B for example).

FIG. 1B shows a prior art transaction flow diagram between a designer 111, IP block owner 100, and FPGA provider 120 for the implementation of a design. In FIG. 1B, a designer 111 communicates first with the FPGA provider 120 as illustrated in circled 1. The communication, circled 1, may be a request to purchase a FPGA device 118 from the FPGA provider 120 (e.g., the FPGA provider may be any commercial supplier of FPGAs such as a distributor, retailer, manufacturer, and/or wholesaler). The FPGA provider 120 then ships to the designer 111 a FPGA 118 in circled 2. (e.g., the FPGA provider 120 may perform a credit check, generate an invoice, and accept an offer as part of a business transaction between designer 111 and FPGA provider 120).

After the designer 111 receives the FPGA 118 from the FPGA provider 120 in circled 2, the designer 111 sends a request to an IP block owner 100 to purchase a proprietary hardware sub-design that the designer 111 requires to complete his hardware system in circled 3. (e.g., an IP block owner 100 may have ownership rights in the proprietary hardware sub-design that the designer 111 needs to complete his hardware system within the time and cost constraints afforded to him). After the designer 111 provides a request to the IP block owner 100 in circled 3 (e.g., the designer 111 may electronically send to the IP block owner 100 an offer to purchase the proprietary hardware sub-design in the form of a purchase order or may telephone the IP block owner 100 to purchase the proprietary hardware sub-design), the IP block owner 100 provides the proprietary hardware sub-design to the designer 111 in circled 4 (e.g., the IP block owner 100 may enter into a contract for a global license and provide the HDL and/or RTL implementation design details and corresponding documentation necessary to implement the proprietary hardware sub-design to the designer 111 after accepting the designer 111's offer to purchase a global intellectual property license for the proprietary hardware sub-design owned by the IP block owner 100).

The designer 111 then incorporates the proprietary hardware sub-design received from IP block owner 100 into the FPGA 118 (e.g., the designer 111 may program the FPGA 118 which has been purchased by the designer 111 from the FPGA provider 120 through the bus 108 as described previously in FIG. 1A). Unfortunately, the IP block owner 100 loses control over his intellectual property after the proprietary hardware sub-design details are sent to the designer 111. Even if the IP block owner 100 encrypts a portion of their proprietary hardware sub-design, the designer 111 can freely replicate and utilize it for as many FPGAs 118 as he/she desires (e.g., by replicating the license code in addition to the encrypted circuit). Furthermore, the IP block owner 100 is unable to determine whether the designer 111 has misappropriated the proprietary hardware sub-design that the IP block owner 100 has provided and is unable to monitor whether the designer 111 has resold the proprietary hardware sub-design to others (e.g., the IP block owner 100 may have invested millions of dollars in the original design of his proprietary hardware sub-design, and may have difficulty in recouping his investment but for misappropriation and/or theft of the proprietary hardware sub-design by the designer 111 because the IP block owner 100 is unable to license his intellectual property to others). Thus, it can be seen that it is desired to provide an improved apparatus and method for protecting proprietary hardware sub-designs created by IP block owners.

SUMMARY

The present invention discloses methods and apparatuses for enforcing terms of a licensing agreement between a plurality of parties involved in a particular hardware design through the use of hardware technologies. According to one aspect of the present invention, a hardware sub-design includes a license verification sub-design that is protected from user modification by encryption. In one aspect, connections between the licensing verification sub-design and portions of the logic code within the hardware sub-design for disabling an IP block are also encrypted to prevent modification. In one aspect, a license is generated based on a trusted host identifier within an external hardware device. In another aspect, a user cannot modify the trusted host identifier. In one aspect of the invention, each trusted host identifier is unique, and no two integrated circuits share the same trusted host identifier. In another aspect of the invention, the integrated circuit is a field programmable gate array or an application specific integrated circuit.

According to another aspect of the present invention, an exemplary method uploads a first hardware sub-design that is designed by a designer onto a programmable gate array having a trusted host identifier, as well as uploads a second hardware sub-design that is provided by a third party and which can only function on the programmable gate array having a particular trusted host identifier. In another aspect of the invention, a license is generated based on a group of trusted host identifiers. In one aspect, the license determines how long the hardware sub-design will operate when the hardware sub-design is implemented within an integrated circuit having a trusted host identifier. The present invention also discloses apparatuses, including software media, which may be used to design integrated circuits. For example, the present invention includes digital processing systems which are capable of designing integrated circuits according to the present invention, and the invention also provides machine readable media which, when executed on a digital processing system, such as a computer system, causes the digital processing system to execute a method for designing integrated circuits.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

Methods and apparatuses for hardware technologies used to enforce terms of a licensing agreement between a plurality of parties involved in a particular hardware design are described herein. In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail. Many of the methods of the present invention may be performed with a digital processing system, such as a conventional general-purpose computer system.

Figure 1A:
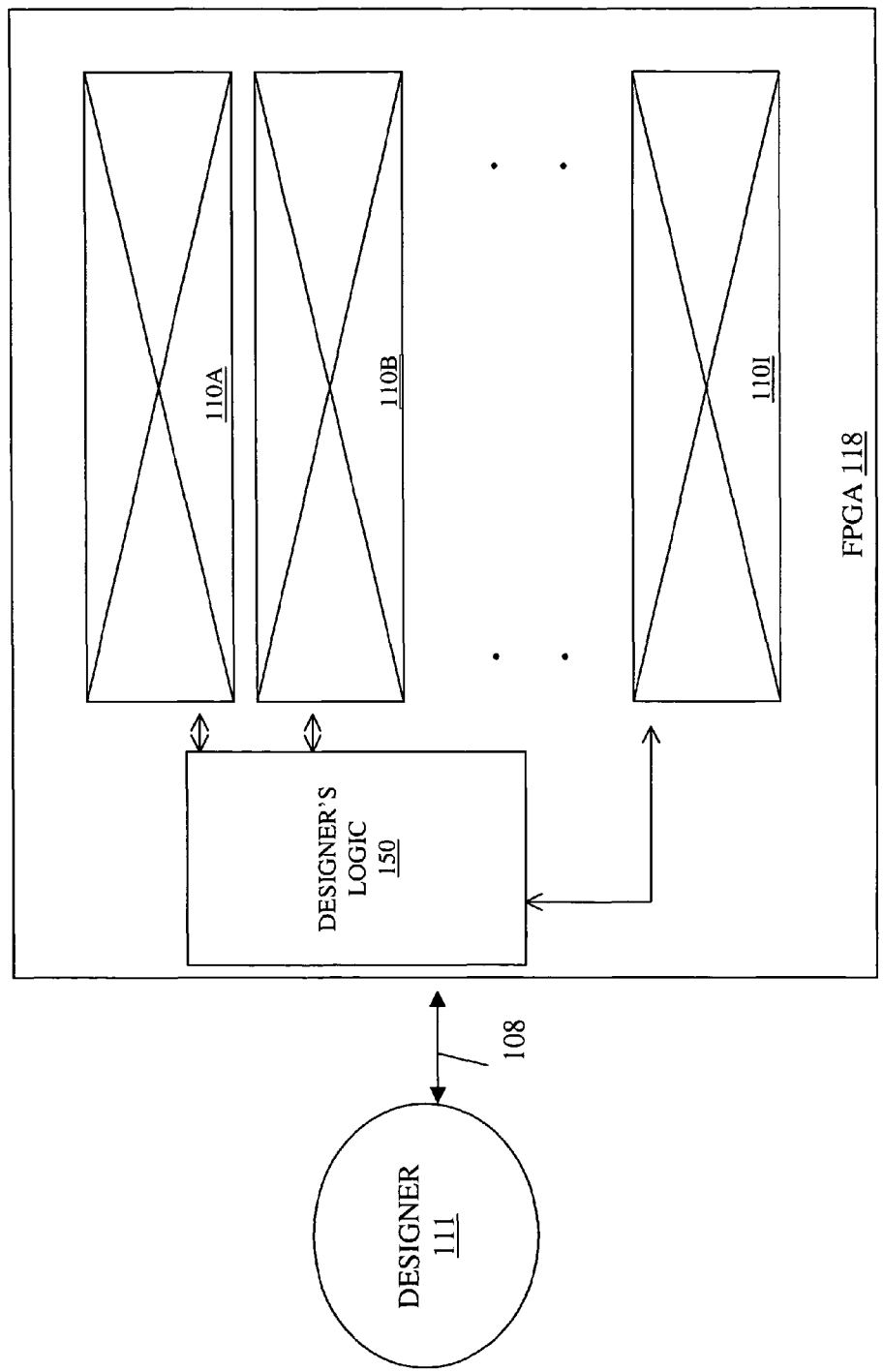
FIG. 1A illustrates a prior art FPGA having a plurality of IP blocks.
Figure 1B:
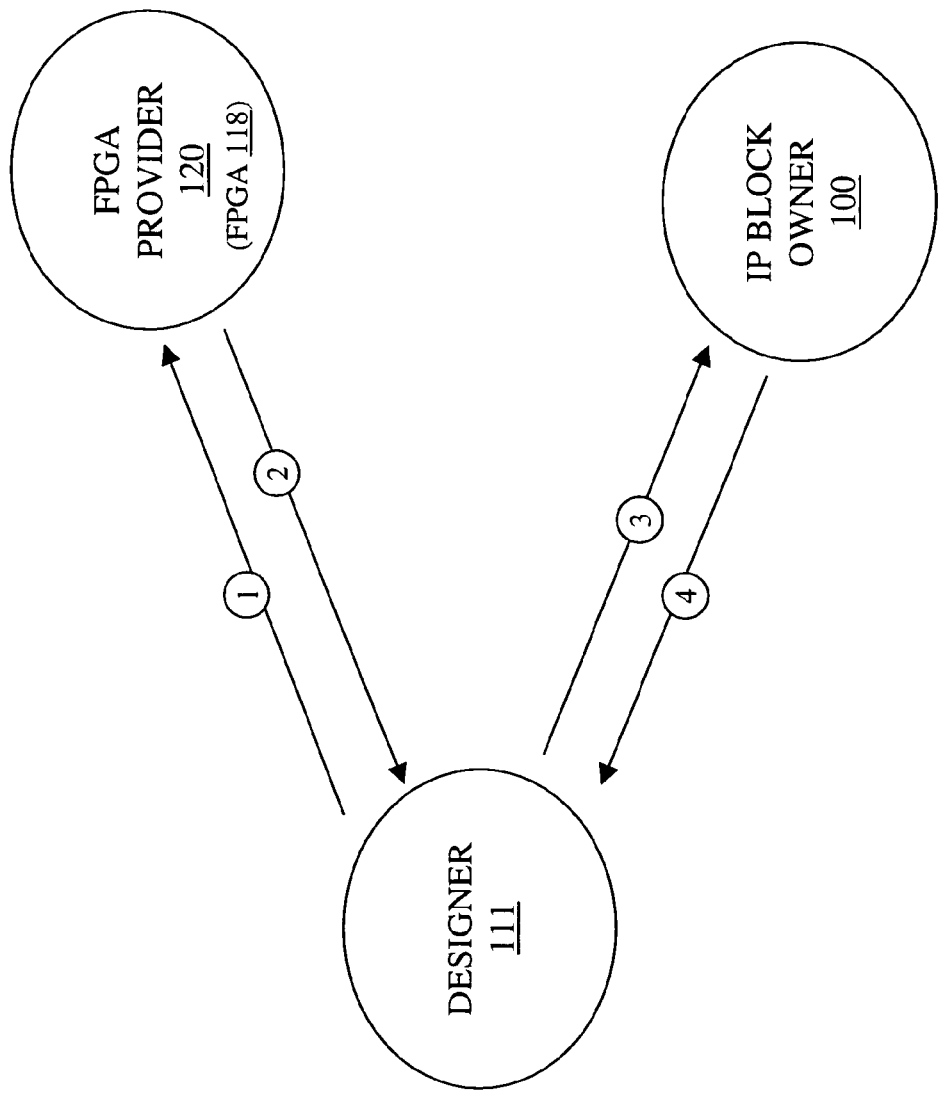
FIG. 1B shows a prior art transaction flow diagram between a designer, an IP block owner, and a FPGA provider for implementation of a hardware design.
Figure 2A:
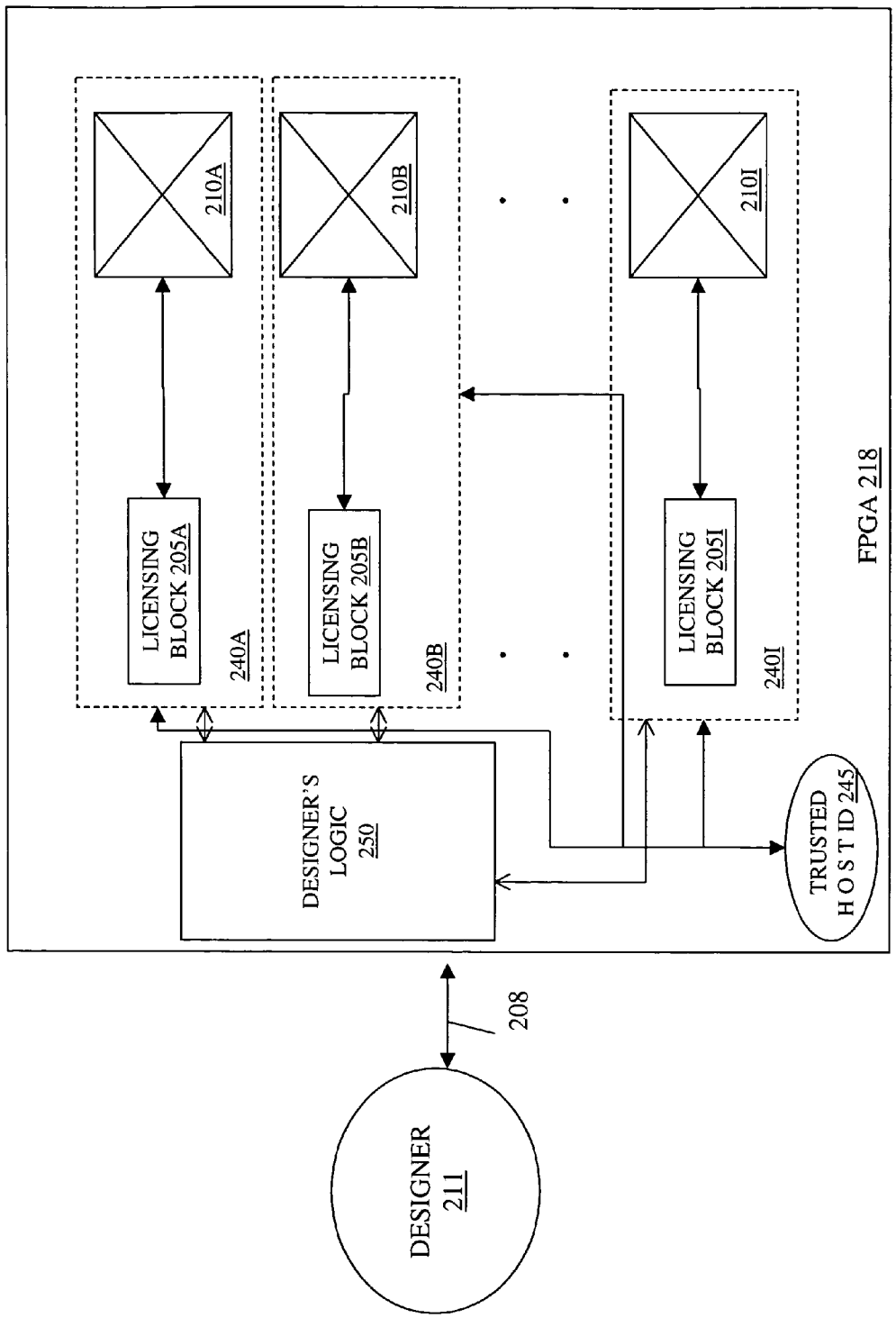
FIG. 2A illustrates a FPGA having a trusted host identifier, a plurality of licensing blocks, and a plurality of IP blocks associated with each licensing block, according to one exemplary embodiment of the present invention.

FIG. 2A illustrates a FPGA 218 having a trusted host identifier 245, a plurality of licensing blocks 205A-205I, and a plurality of IP blocks 210A-210I associated with each licensing block 205A-205I, according to one exemplary embodiment of the present invention. A designer 211 communicates with the FPGA 218 through bus 208 (e.g., the designer 211 may compile all parts of a hardware sub-design by synthesizing, placing, routing, and generating a bit stream before downloading to an FPGA through bus 208). The designer 211 may be a hardware system designer who uses hardware sub-designs created internally as well as that purchased from third parties, according to one embodiment (e.g., the designer 211 may purchase a particular hardware sub-design from an IP block owner 200 and combine it with the designer's logic 250 to make a complete design within a FPGA 218 through bus 208). The bus 208 may be a direct connect local bus (e.g., a computer connected directly to the FPGA through a serial and/or parallel port). Alternatively, the bus 208 may be a local or wide area network from which designer 211 communicates to FPGA 218, according to another embodiment.

The FPGA 218 includes a designer's logic 250, a trusted host ID 245, and one or more IP locations 240A-240I. The designer's logic 250 includes hardware sub-designs that have been solely created by a designer 211. (e.g., the designer's logic 250 might include hardware sub-designs that have been verified and already tested, or may include hardware sub-designs that have been previously used in other designs). The designer's logic 250 is separated from the IP locations 240A-240I because IP locations 240A-240I may be used for hardware sub-designs that have been designed by a third party in one embodiment.

Figure 2B:
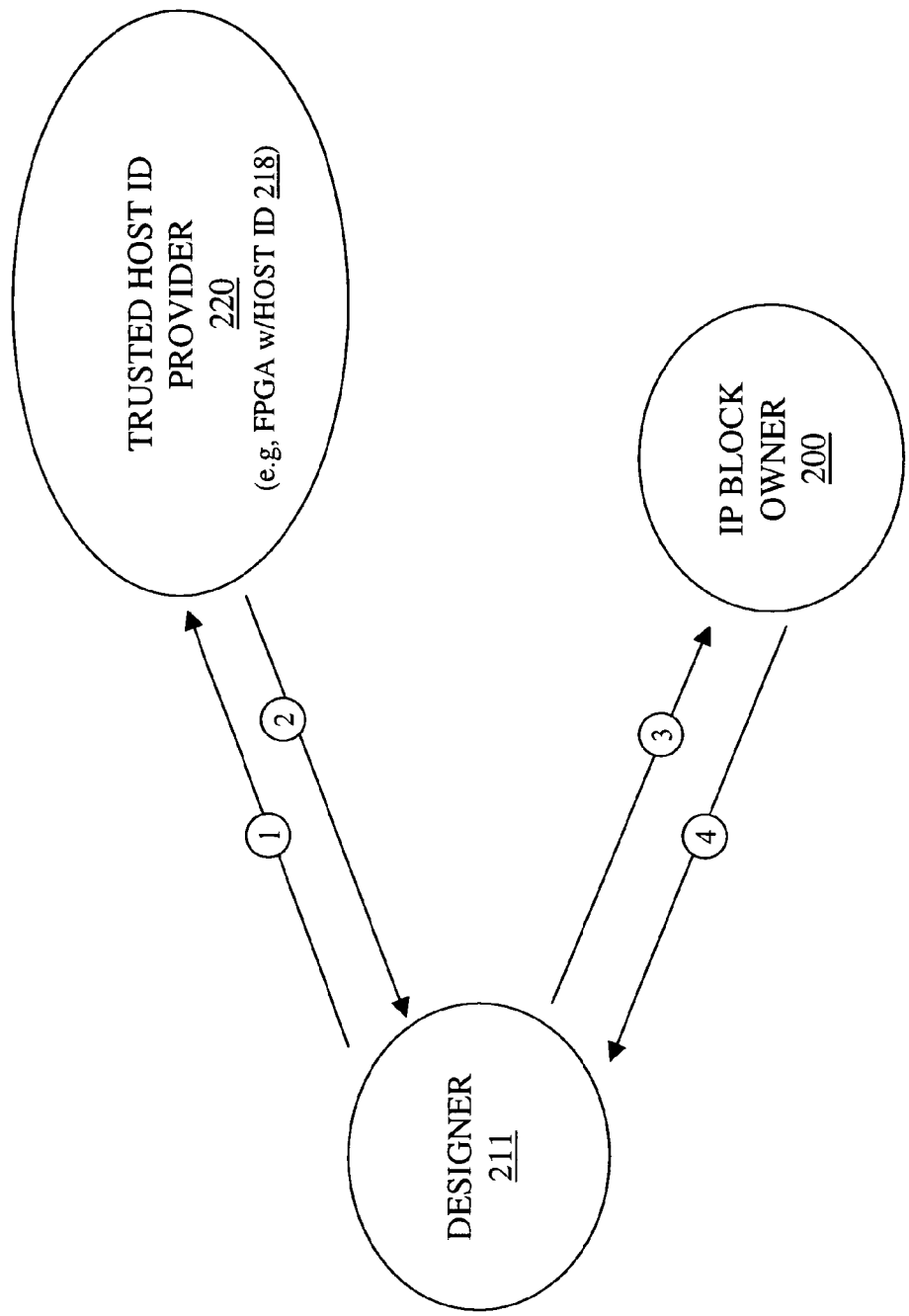
FIG. 2B shows a transaction flow diagram between a designer, an IP block owner, and a trusted host ID provider for the implementation of a hardware design using a trusted host identifier and a license code, according to one exemplary embodiment of the present invention.

A trusted host ID 245 (trusted host identifier) within the FPGA 218 maintains a unique, trusted host identifier for FPGA 218. The trusted host ID 245 may be implemented within a field programmable gate array using a built-in serial number (e.g., an FPGA may be manufactured a built-in serial number or the built-in serial number may be a one time programmable serial number) plus a design component that can be used in a license verification sub-design (e.g., a license verification sub-design within a hardware sub-design) to access that serial number without user visible connections in one embodiment (e.g., to protect the license verification portion of the sub-design from modification by the user). The trusted host ID 245 may be a unique number that has been permanently associated with FPGA 218 in one embodiment (e.g., the trusted host ID may be a number that was preset by a trusted host ID provider such as an FPGA manufacturer during fabrication). In one embodiment, a portion of the trusted host ID 245 may be common for a group of FPGAs (e.g., a mask having a fixed upper set of bits and the trusted host ID may be combined) that have been sold to a designer 211 by a trusted host ID provider 220 as shown in FIG. 2B. (e.g., a portion of the numeric host ID may be associated with a particular batch of FPGAs sold by a trusted host ID provider 220 to designer 211 so as to indicate the manufacturing time and/or location of manufacture of the FPGA 218). The identity of the trusted host ID 245 may be retrievable by designer 211 through bus 208 by querying the FPGA 218 in one embodiment. (e.g., a software program owned by designer 211, or a software program may allow designer 211 to read the contents of the trusted host ID 245). It should be noted that the trusted host ID 245 is unalterable without completely disabling FPGA 218 (e.g., the trusted host ID 245 may be protected against tampering through a circuit breaker that disables the FPGA 218 if someone attempts to change the identity of trusted host ID 245). In one embodiment, the trusted host ID 245 is external to a field programmable gate array and various known techniques can be used for secure communication over insecure channels (e.g., virtual private networking protocol).

In one embodiment, a designer 211 may compile all parts of a hardware sub-design by synthesizing, placing, routing, and generating a bit stream before downloading to an FPGA 218. Alternatively, in another embodiment for partial reconfiguration, each IP block 205A-205I may be downloaded separately to different locations on FPGA 218. Each IP location 240A-240I includes a licensing block 205A-205I and an IP hardware design block 210A-210I (e.g., or IP block 210A-210I). Each IP location 240A-240I may be connected to designer logic 250. (e.g., to allow a particular IP location 240A to communicate and share hardware sub-design instructions with designer logic 250). The IP locations 240A-240I may be enabled and disabled when a new hardware sub-design is added and/or deleted from within an IP block 210A-210I in one embodiment. (e.g., an IP location 240A may be a logical association of a particular licensing block 205A to an IP block 210A that is created when proprietary hardware sub-designs purchased from an IP block owner as shown in FIG. 2B are added and/or deleted within the FPGA 218, as opposed to a physical IP location). The licensing blocks 205A-205I may be used to enable IP blocks 210A-210I in one embodiment. (e.g., a particular licensing block 205A may unlock the contents of the IP block 210A to reveal a hardware sub-design that is provided by an IP block owner 200 as illustrated in circled 4 of FIG. 2B).

The licensing block 205A may receive a license and analyze a trusted host identifier 245 to decide which features of an IP block to enable. In one embodiment, the licensing blocks 205A-205I include license verification hardware (e.g., a license verification sub-design within the hardware sub-design that is encrypted while generating the hardware sub-design) that validates consistency of a license code received from an IP block owner 200 (as shown in FIG. 2B) with the trusted host identifier 245 to enable operation of the hardware sub-design. As such, the licensing blocks 205A-205I may operate as electronic locks which keep out unlicensed designers of intellectual property from accessing hardware sub-designs within the IP blocks 210A-210I by comparing a license code received from an IP block owner (such as an IP block owner 200 as shown in FIG. 2B) with an internal encryption scheme within the licensing blocks 205A-205I that is dependent upon the trusted host ID 245 (e.g., the license code may work only on a FPGA having a particular trusted host ID 245 in one embodiment. In one embodiment, the licensing block 205A may receive a license code (e.g. a string of binary data) through bus 208 from the designer 211 who received the license code from an IP block owner 200 (as shown in circled 4 on FIG. 2B). In another embodiment, a licensing block 205A may compare the license code with the trusted host ID 245 and the encryption scheme within the licensing block 205A. In one embodiment, the license code may be embedded within an IP block 210A-210I and/or may be embedded within the designer's logic 250.

The IP blocks 210A-210I may be hardware sub-designs that have been provided by a third party IP block owner, according to one embodiment. (e.g., IP block owner 200 as later will be described in FIG. 2B). Different IP block owners may have sold or licensed their hardware sub-designs to a designer 211 in another embodiment to form the IP blocks 210A-210I. (e.g., a first IP block owner may provide the hardware sub-design within IP block 210A, whereas a different IP block owner may provide the hardware sub-design within IP block 210B). Multiple ones of IP blocks 210A-210I may share a common licensing block 205A-205I in another embodiment and/or may allow a common license code to enable their contents. (e.g., the same license code may operate to unlock a licensing block 205A as well as licensing block 205B). The licensing block 205A-205I may include a license verification sub-design that has been encrypted to prevent modification. In one embodiment, the IP blocks 210A-210I will only function on the FPGA 218 having a particular host ID 245 value, and will not function on a different FPGA that has a different host ID value. The licensing blocks 205A-205I may make a decision to operate based on a combination of a trusted host identifier 245 and a license provided by the IP block owner 200 in one embodiment. In the case that the license is not valid and verification fails, the operation of the hardware sub-design may be prevented by asserting signals that interfere (e.g., causing state machines to reset and memories to never write) with the logic of the hardware-sub-design in one embodiment. The license verification sub-design may be encrypted so that the user is not able to modify any portion of the license verification sub-design (e.g., the design tool flow may prevent editing of this part of the hardware sub-design). In one embodiment, the hardware sub-design is encrypted only for the purpose of protecting a license verification sub-design within the hardware sub-design from modification. In one embodiment, connections between the licensing verification sub-design and portions of the logic code within the hardware sub-design for disabling the IP block may be encrypted to prevent modification.

FIG. 2B shows a transaction flow diagram between a designer 211, an IP block owner 200, and a trusted host ID provider 220 for the implementation of a hardware design using a trusted host ID 245 and a license code, according to one exemplary embodiment of the present invention. In FIG. 2B, a designer 211 sends a request to purchase a FPGA with a host ID 218 to a trusted host ID provider 220. In one embodiment, the trusted host ID provider 220 may be a trusted manufacturer such as a FPGA manufacturer that has developed a trustworthy business reputation sufficient so that the IP block owner 200 believes that each FPGA manufactured by the trusted manufacturer has a unique and uneditable host ID 218.

Figure 3:
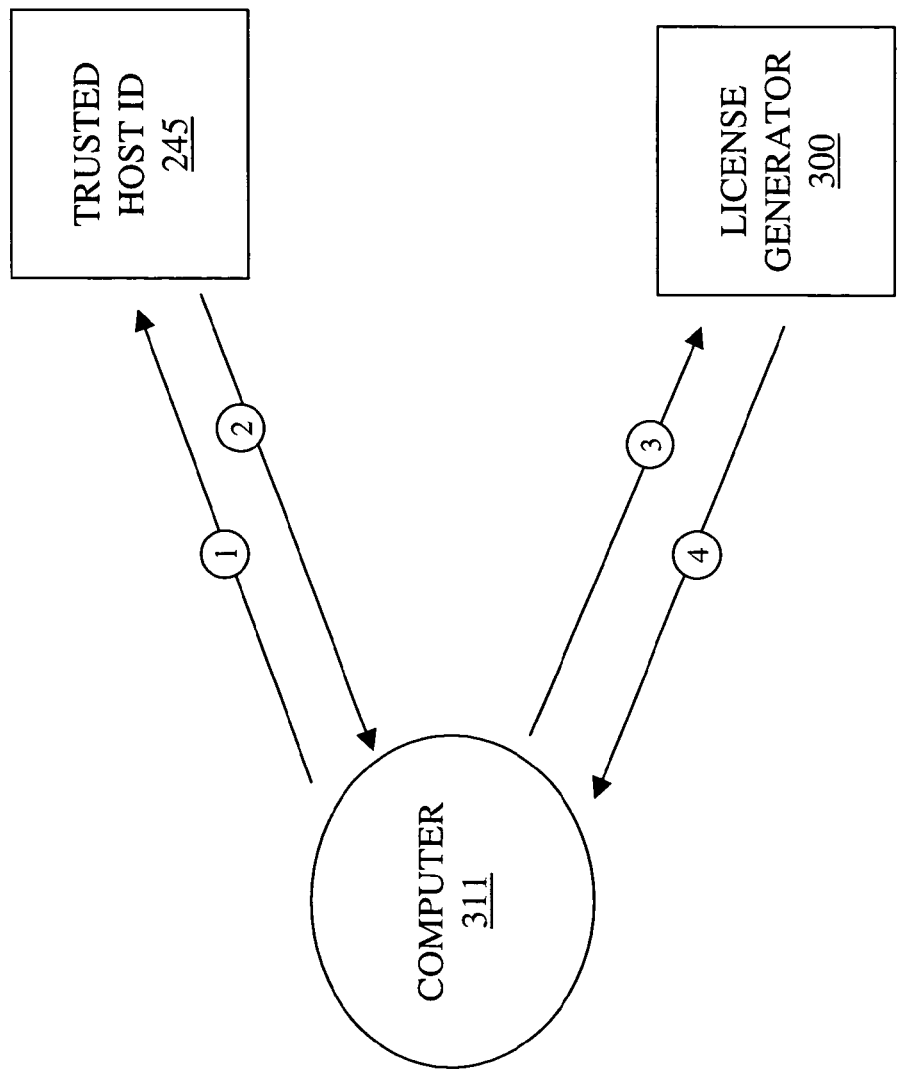
FIG. 3 shows a hardware diagram of the use of a trusted host identifier and a license code between a computer, a license generator, and a trusted ID provider for the implementation of a design, according to one exemplary embodiment of the present invention.

Alternatively, in another embodiment, the trusted host ID provider 220 may be a company that manufactures an external hardware device (e.g., a dongle and/or microchip), which provides a trusted host identifier when connected to a computer (e.g., such as computer 311 in FIG. 3). In circled 1, the designer 211 orders a trusted host ID (or FPGA with trusted host identifier 218) from the trusted host ID provider 220. (e.g., the designer 211 may place an order by sending a purchase order to the trusted host ID provider 220 for the purchase of an FPGA 218 with a built in trusted host identifier 245 for use in a design of a customized integrated circuit). The designer 211 may also inform the trusted host ID provider 220 which IP block owner 200's hardware sub-design the designer 211 intends to use in his/her hardware system in circled 1 (e.g., the designer 211 may communicate to the trusted host ID provider that he/she intends to use a hardware sub-design created by IP block owner 200 for example).

In circled 2, the trusted host ID provider 220 ships a FPGA with a trusted host ID 218 to the designer 211, or alternatively provides an external hardware device having a trusted host identifier (e.g., the trusted host ID provider 220 may enter into a binding contract with designer 211 and produce a unique host-ID for each FPGA 218 ordered by the designer 211 for example). In one embodiment, the external hardware device may be directly connected to the FPGA and it may not required that the external hardware device be connected to a computer. In one exemplary embodiment, if the trusted host ID provider 220 provides an external hardware device, the designer 211 may need to connect the external hardware device to a computer connected to an ASIC and/or FPGA on which a hardware sub-design owned by an IP block owner 200 is used. (e.g., the designer 211 may connect a peripheral device having a trusted host identifier to a USB port on a computer that the designer 211 may use to write to an ASIC and/or FPGA that uses the hardware sub-design owned by the IP block owner 200). Alternatively, the serial number of a computer may be used as the host identifier in one embodiment. It should be noted that the IP block owner 200 must trust (e.g., have faith) that the host identifiers generated by the external hardware device are unique and unmodifiable. As such, the IP block owner 200 may need to pre-qualify each trusted host ID provider 220 that wishes to generate trusted host identifiers in one embodiment. In another embodiment, an independent trade organization may provide guidelines and qualification of trusted host ID providers.

Next, in circled 3, the designer 211 informs the IP block owner 200 that the designer 211 has made a purchase of the FPGA w/host ID 218 (or an external device having a trusted host identifier), and the designer 211 places an order for a hardware sub-design owned by IP block owner 200 (e.g., the designer 211 may purchase part of a complex integrated circuit design from the IP block owner 200 so that the designer 211 can save time rather than designing from scratch for example). The designer 211 may also inform the IP block owner 200 of the identity of the trusted host ID (e.g., the designer 211 may run a software program that determines the identity of the trusted host identifier by reading a fixed register bit within the FPGA with host ID 218 and/or on an external hardware device).

Next, the IP block owner 200 combines the trusted host ID information it receives from designer 211 in circled 3 to generate a trusted host ID specific license for designer 211 that is customized for the hardware sub-design that the designer 211 wishes to purchase. (e.g., the IP block owner 200 may encrypt the license verification sub-design within the hardware sub-design using the trusted host ID 245 as shown in FIG. 2A, and generate a license code that requires that only a particular host identifier 218 be used to validate and enable one or more features within the hardware sub-design provided by the IP block owner 200). In one embodiment, the license verification sub-design may make a decision to operate based on a combination of a trusted host identifier 245 and a license provided by the IP block owner 200. In the case that the license is not valid and verification fails, the operation of the hardware sub-design may be prevented by asserting signals that interfere with the logic of the hardware-sub-design in one embodiment.

Then, in circled 4, the IP block owner 200 provides the hardware sub-design (e.g., the hardware sub-design owned by the IP block owner 200) along with a license code (e.g., a license code that unlocks one or more features within the hardware sub-design owned by the IP block owner 200) that is customized for a particular FPGA with a unique host ID 218 to designer 211. In one embodiment, the IP block owner 200 generates a license verification sub-design within the hardware sub-design that is encrypted to prevent modification. In one embodiment, a license is generated for a group of trusted host IDs for a variety of FPGAs that the designer 211 wishes to use the hardware sub-design owned by IP block owner 200 on. (e.g., the IP block owner 200 may receive an order from designer 211 for placing the hardware sub-design owned by the IP block owner 200 on a group of FPGAs, each having a unique host ID, and the IP block owner 200 may authorize the use of his hardware sub-design to all qualifying host IDs that the designer 211 has purchased).

By providing a license that can only work on an FPGA with a trusted host ID 245, the IP block owner 200 is able to better regulate the ways the hardware sub-design, owned by the IP block owner 200, is used (e.g., the IP block owner 200 can restrict the use of his/her hardware sub-design only to certain FPGAs by providing a license to the designer 211 that works with only a certain group of trusted host IDs). Alternatively, the IP block owner 200 may provide a license code that requires an external hardware device that includes a trusted host identifier be connected to a computer at the designer 211 in one embodiment. For example, the IP block owner 200's hardware sub-design may operate only on an ASIC and/or an FPGA that has the external hardware device connected. As such, the IP block owner 200 is able to charge a variable amount for his/her intellectual property (e.g., hardware sub-designs), by charging on a per use basis rather than for a global license. (e.g., the IP block owner 200 can charge for each FPGA on which their hardware sub-design is used because there is an enforcement mechanism in that every instance of the hardware sub-design is known, as opposed to a one-time fee to license a hardware sub-design for all FPGAs). In addition, by restricting the operation of the hardware sub-design owned by the IP block owner 200 to only licensees having a trusted host identifier, the IP block owner 200 is able to prevent unauthorized sublicensing and/or theft of the hardware sub-designs owned by the IP block owner 200. As such, the designer 211 is unable to generate unauthorized copies of the hardware sub-design(s) that the designer 211 has licensed from the IP block owner 200 without getting prior permission from the IP block owner 200. The designer 211 must purchase a license that explicitly allows the designer 211 to use additional copies because the hardware sub-designs that the designer 211 receives from the IP block owner 200 will only work in conjunction with a particular trusted host identifier. (e.g., the IP block owner 200 is able to prevent the spread of the hardware sub-design owned by the IP block owner 200 because the licenses granted by the IP block owner 200 may be restricted only to FPGAs with particular trusted host IDs).

FIG. 3 shows a hardware diagram of the use of a trusted host identifier and a license code between a computer, a license generator, and a trusted host ID provider for the implementation of a design, according to one exemplary embodiment of the present invention. FIG. 3 is similar to FIG. 2B in that all the processes occurring in FIG. 2B occur in FIG. 3, except that FIG. 3 illustrates the particular hardware used by the parties shown in FIG. 2B. A computer 311 resides within a designer 211 as previously described in FIG. 2B (e.g., the computer 311 may communicate with an FPGA with host ID 218 through bus 208 as described in FIG. 2A). The computer 311 receives a trusted host ID 245 from a trusted host ID provider 220 in the communications that are illustrated circled 1 and 2, and as previously described in FIG. 2B (e.g., a FPGA 218 may be shipped by a trusted host ID provider 220 to a designer 211 as shown in FIG. 2B for use in a computer 311 after the parties enter into a contract). A license generator 300 within the IP block owner 200, in circled 3 and 4, then generates a license that is specific to the trusted host identifier 245 (e.g., the license generator 300 may generate a license that depends on a particular host identifier 245 for a hardware sub-design to be unlocked). In one embodiment, the license generator 300 is an application program that is used by the IP block owner 200 to generate an encrypted license verification sub-design within the hardware sub-design and a customized host ID specific license code that is dependant on the trusted host ID 245 within a particular FPGA 218. In circled 4, the trusted host ID specific license code as well as the hardware sub-design is provided to computer 311 (the computer 311 at the designer 211 as described in FIG. 2B) from the license generator 300.

Figure 4A:
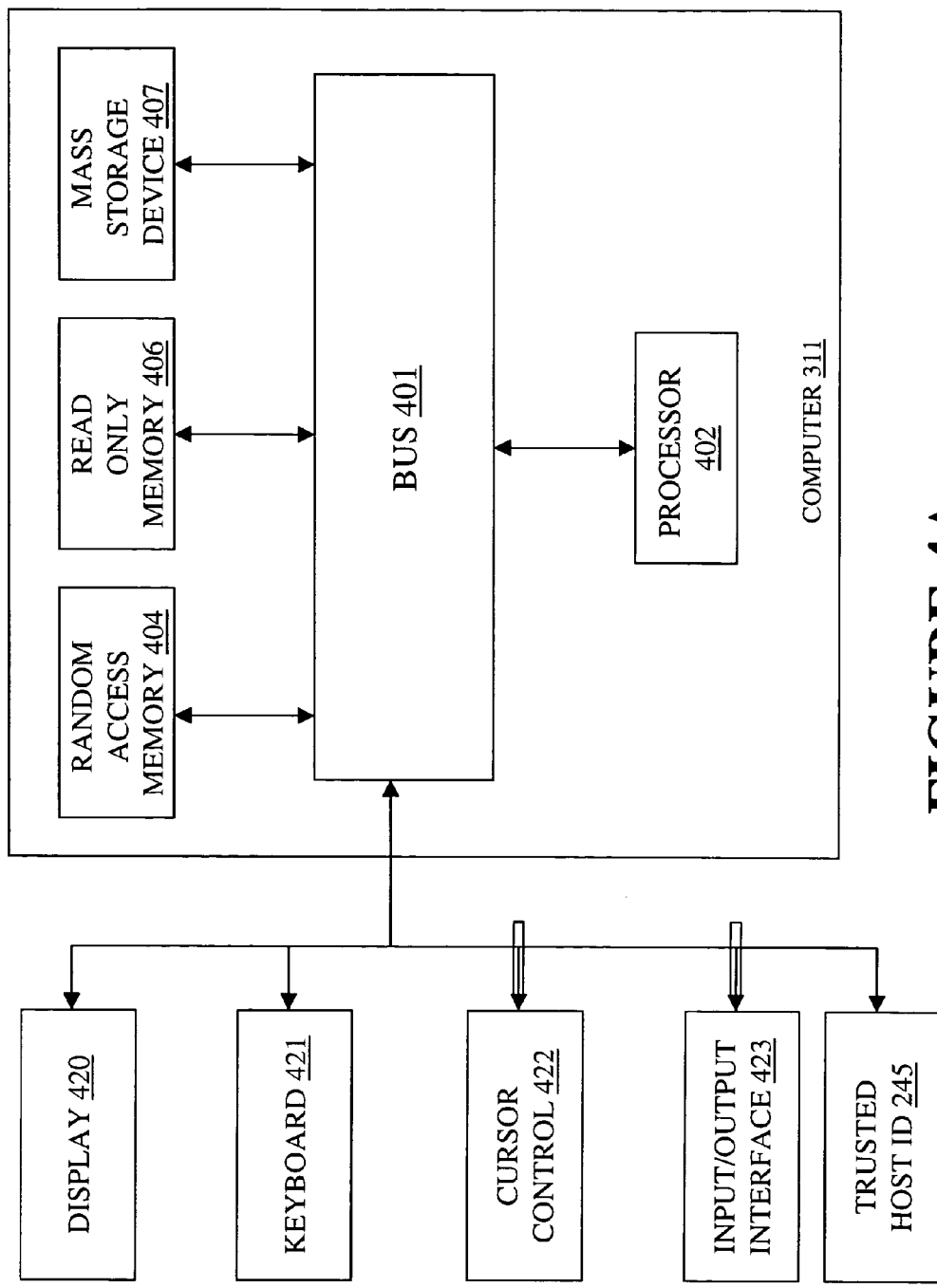
FIG. 4A is a block diagram of a computer that may be used to implement embodiments of the present invention.

FIG. 4A is a block diagram of a computer system 311 that may be used to implement embodiments of the present invention. The computer system 311 is used to perform logic synthesis of a design that is described in an HDL code. The computer system 311 includes a processor 402 that is coupled through a bus 401 to a random access memory 404 and a read-only memory 406 and a mass storage device 407. Mass storage device 407 represents a persistent data storage device such as a floppy-disk drive, a fixed disk drive (e.g., magnetic drive, optical drive, or the like). Processor 402 may be embodied in a general-purpose processor (such as the Intel Pentium® processors) a special purpose processor and/or a specially programmed logic device. Display 420 is coupled to the processor 402 through bus 401 and provides graphical output for the computer system. This graphical output is typically a graphical user interface that may be used to control the operation of the computer system. Keyboard 421 and cursor control device 422 are coupled to bus 401 for communicating information and command selections to processor 402. The cursor control device 422 will typically be a mouse or other cursor control device that will be used to control a cursor displayed on the display device 420. Also coupled to processor 402 through bus 401 is an input/output interface 423 which can be used to control and transfer data to and from electrical devices such as printers and other computers that are coupled to the computer system 311. The trusted host identifier 245 may also be coupled to the computer system 311. In one embodiment, the trusted host identifier 245 is an external hardware device. In another embodiment, the trusted host identifier is within a FPGA 218 having a trusted host identifier 245. The trusted host identifier 245 may also be coupled to a particular input/output interface 423 rather than directly to the computer system 311.

It should be noted that the architecture of FIG. 4 is provided for purposes of illustration only and that a computer system or other digital processing system used in conjunction with the present invention is not limited to this specific architecture.

Figure 4B:
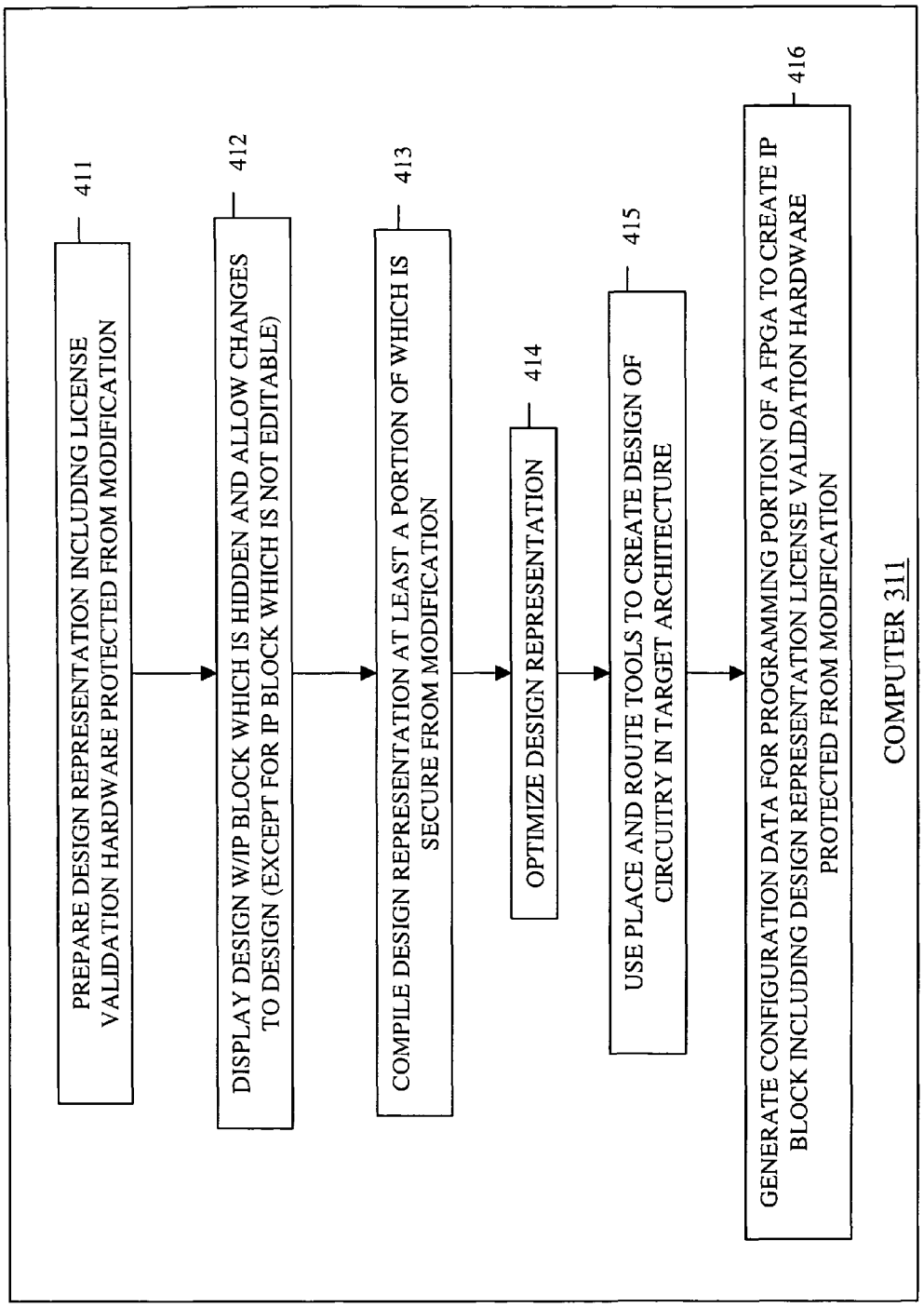
FIG. 4B is a flow chart illustrating operations within a computer at a designer that are used to implement a hardware sub-design within a FPGA having a trusted host identifier, according to one exemplary embodiment of the present invention.

A general example of certain embodiments of the present invention will now be provided while referring to FIG. 4B. FIG. 4B is a flow chart illustrating operations within a computer 311 at a designer 211 that are used to implement a hardware sub-design within a FPGA 218 having a trusted host identifier 245, according to one exemplary embodiment of the present invention. While most embodiments of the present invention are intended for use in HDL design synthesis software, the invention is not necessarily limited to such use. It should be noted that in one embodiment, the hardware sub-design could in fact be simply represented as a simple netlist with appropriate parts obscured by encryption. The hardware sub-design does not have to be HDL or a behavioral description. Although use of other languages in computer programs is possible, embodiments of the present invention will be described in the context of use in HDL synthesis systems, and particularly those designed for use with integrated circuits which have vendor specific technology/architectures.

As is well known, a supplier of programmable ICs typically determines the target architecture. An example of a target architecture is the programmed look-up tables (LUTs) and associated logic of field programmable gate arrays from Xilinx, Inc., of San Jose, Calif. Other examples of target architecture/technology include those well-known architectures in FPGAs and complex programmable logic devices from vendors such as Altera, Lucent Technologies, Advanced Micro Devices, and Lattice Semiconductor. For certain embodiments, the present invention may also be employed with ASICs.

The method of FIG. 4B begins in operation 411 in which a designer (such as a designer 211 as shown in FIG. 2B) prepares a design representation (e.g., a behavioral description of a desired circuit) including license validation hardware protected from modification. In operation 412, the design is displayed with the IP block, which is hidden, and changes are allowed to the design except for the IP block which is not editable (e.g., the designer's logic 250 may be editable whereas the IP locations 240A-240I having hardware sub-designs provided by an IP block owner 200 may be hidden and may be partly or completely uneditable as shown in FIG. 2A). The design representation is then compiled by an HDL compiler in operation 413 to generate a technology independent RTL netlist. This netlist is independent of the particular vendor's technology which means that it is independent of the library of building blocks (e.g., look-up tables, multiplexers, AND/OR arrays, and so on) that is used by a particular target architecture. At least a portion of the design representation is secure from modification because it has been encrypted.

In operation 414, the design representation is optimized (e.g., the logic is optimized to improve timing parameters of the logic). This operation is optional and is used to remove duplicative interconnects and logic elements according to optimization routines. Then in operation 415, conventional place and route software tools are used to create a design of circuitry in the target architecture, such as a Xilinx or Altera FPGA. Next in operation 416, configuration data for programming a portion of an FPGA to create an IP block (e.g., an IP block having a hardware-sub-design purchased from an IP block owner 200) including design representation license validation hardware protected from modification is generated.

Figure 4C:
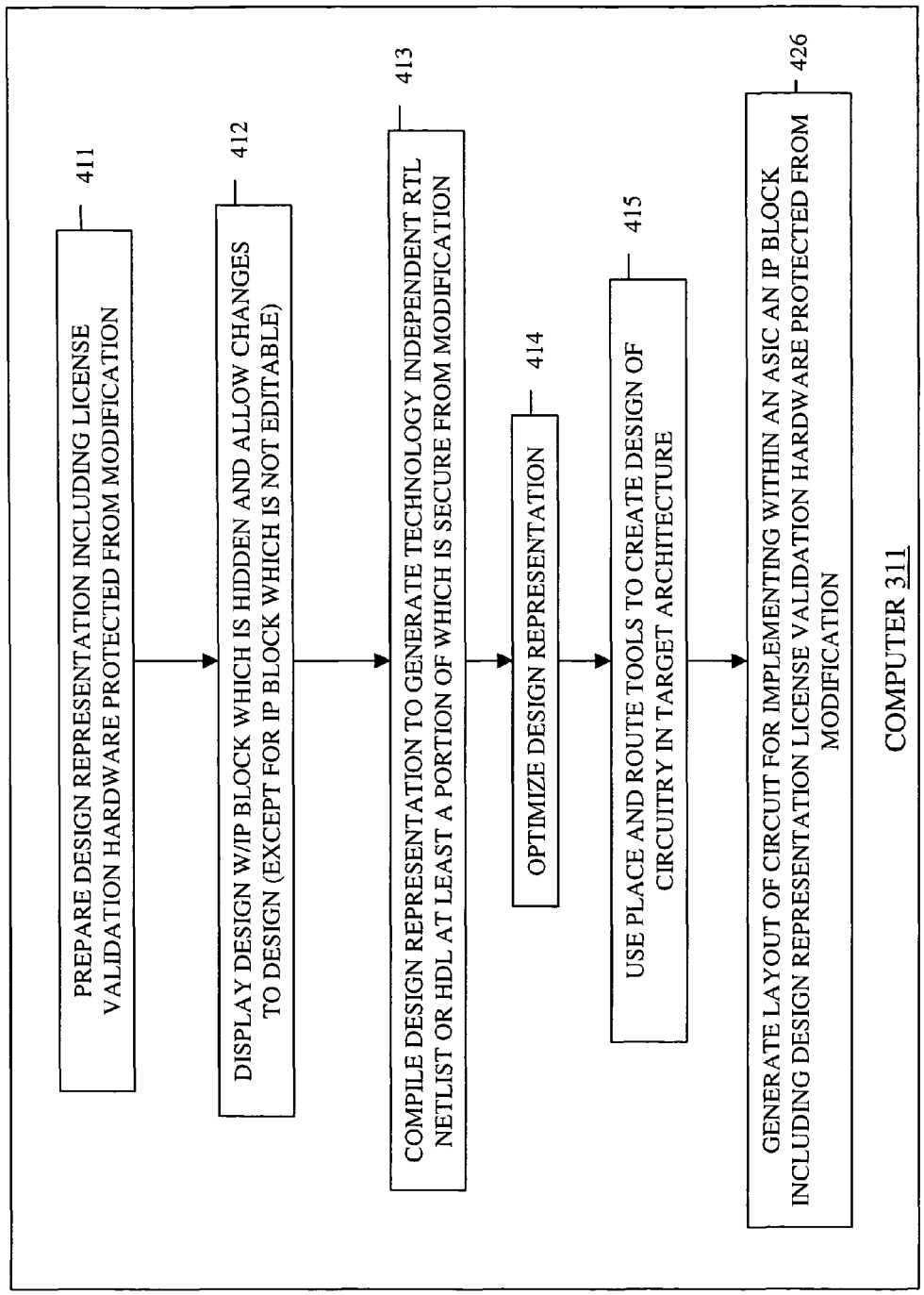
FIG. 4C is a flow chart illustrating operations within a computer at a designer that are used to implement a hardware sub-design within an ASIC using an external hardware device having a trusted host identifier, according to one exemplary embodiment of the present invention.

FIG. 4C is a flow chart illustrating operations within a computer 311 at a designer 211 that are used to implement a hardware sub-design within an ASIC using an external hardware device having a trusted host identifier 245, according to one exemplary embodiment of the present invention. The implementation of hardware sub-designs owned by an IP block owner 200 within an ASIC requires that the designer 211 purchase an external hardware device as previously discussed in FIG. 2B. The operations 411-415 shown in FIG. 4C are the same as operations shown in FIG. 4B. In operation 426 on FIG. 4C, a layout of a circuit for implementing within an ASIC an IP block including design representation license validation hardware protected from modification is performed because the hardware sub-design is licensed for use on an ASIC rather than an FPGA.

Figure 5:
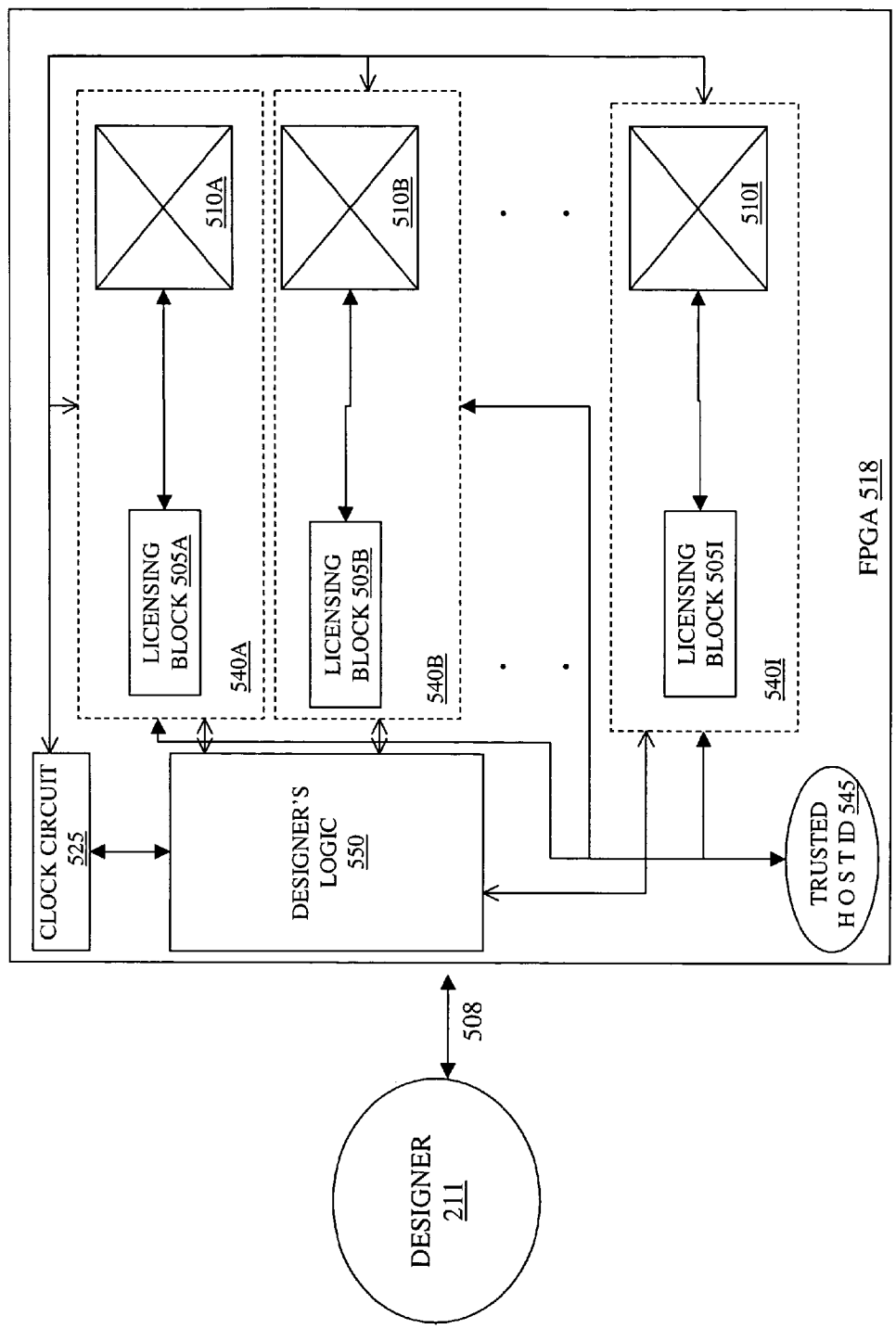
FIG. 5 illustrates a FPGA having a trusted host identifier, a plurality of licensing blocks, a plurality of clock memories, and a plurality of IP blocks associated with each licensing block and clock memories according to one exemplary embodiment of the present invention.

FIG. 5 illustrates a FPGA 518 having a trusted host identifier 545, a designer's logic 550, a plurality of licensing blocks 505A-505I, a clock circuit 525, and a plurality of IP blocks 510A-510I associated with each licensing block 505A-505I and the clock circuit 525 according to one exemplary embodiment of the present invention. The FPGA 518 is similar to FPGA 218 as previously described in FIG. 2A. However, the FPGA 518 illustrated in FIG. 5 includes a clock circuit 525 that communicates with each licensing block 505A-I within IP location 540A-540I. The clock circuit 525 may store a new value (e.g., a count of how many times a particular hardware sub-design has been executed, or the current date/time, etc.) only if it is larger than the previously stored value in one embodiment. In one embodiment the clock circuit 525 cannot be reset and is used only to make sure that recorded time continues to move forward.

Each IP location 540A-540I includes a licensing block 505A-505I and an IP block 510A-510I. The clock circuit 525 stores information that governs how long a particular IP location 540A-540I will operate (e.g., the clock circuit 525 may store information about how long the IP location 540A may be operational based upon a license code provided to a licensing block 505A by a IP block owner 200 as shown in FIG. 2A). In one embodiment, when the limit for a particular operation period is reached, the clock circuit 525 may disable one or more IP blocks 510A-510I. (e.g., similarly as discussed previously in FIG. 2A, the IP location 540A-540I may be a logical module that can be enabled for the period of time the IP block 510A-510I associated with the IP location 540A-540I is accessible by a designer 211, and disabled when the license to access the hardware sub-design within a IP hardware design block 510A-510I is expired).

In one embodiment, the clock circuit 525 may store the last time a particular IP block 510A-510I associated with the clock circuit 525 was updated (e.g., the last time a designer 211 uploaded a particular third party hardware sub-design to an IP block 510A-510I through a bus 508). In another embodiment, the clock circuit 525 may store a countdown timer that determines how long the licensing block 505A is allowed to operate (e.g., how long before the IP location associated with the IP block is disabled). In another embodiment of the present invention, the clock circuit 525 may include the last updated time of a group of IP locations 540A-540I (e.g., if an IP block owner 200 had previously licensed a group of hardware sub-designs to the designer 211, then the clock circuit 525 may store the last updated time for a group of IP locations 540A and 540B for a partial reconfiguration scenario for example). In one embodiment, an external hardware device having host ID 545 may include a clock circuit (e.g., similar to clock circuit 525 for example) that is powered by a battery and allows the hardware sub-designs within the IP blocks 510A-510I to operate for a predetermined amount of time. In another embodiment, memory within an external hardware device having a trusted host identifier 545 may include all of the embodiments discussed for the clock circuit 525 as discussed above.

In one embodiment, a designer 211 may use a software application which itself uses a software licensing subsystem (e.g., GLOBETROTTER® by Macromedia, Inc. of Santa Clara, Calif.) to receive an evaluation license for a hardware sub-design from the IP block owner 200. The evaluation license may include a software-based trusted host identifier (e.g., the evaluation license may include the software-based trusted host identifier within additional bits of data sent along with a software license for the application software). The designer 211, using the software application, may then transfer (e.g., via a JTAG serial communication scheme) the software-based trusted host identifier and the evaluation license to the licensing block 505A within the FPGA 518 as shown in FIG. 5, so that the licensing block 505A can enable one or more features within the hardware sub-design using the software-based trusted host-identifier. In one embodiment, a trusted host identifier 245 used by an encrypted portion (e.g., the license verification sub-design within the hardware sub-design) of the IP block 210A or the licensing block 205A, may be generated to enable a remaining portion of the IP block 210A (e.g., the hardware sub-design), when the trusted host identifier 245 is provided by software at the time of programming or manufacturing the integrated circuit. In another embodiment, trusted host identifier is provided by the IP block owner 200 to the designer 211 through software at the time of programming or manufacturing an integrated circuit to enable the IP block 210A for example. This software may be run by the designer 211 at the time that the integrated circuit is being programmed, and this software would typically include executable computer program code which, through an authorization message or signal provided by the IP block owner, would cause the integrated circuit to be programmed or manufactured with an enabled IP block. This authorization message or signal may be provided in an encrypted portion of the software or data structures which are utilized by the software, or this authorization message or signal may be provided through a network connection from a data processing system controlled by the IP block owner.

Figure 6:
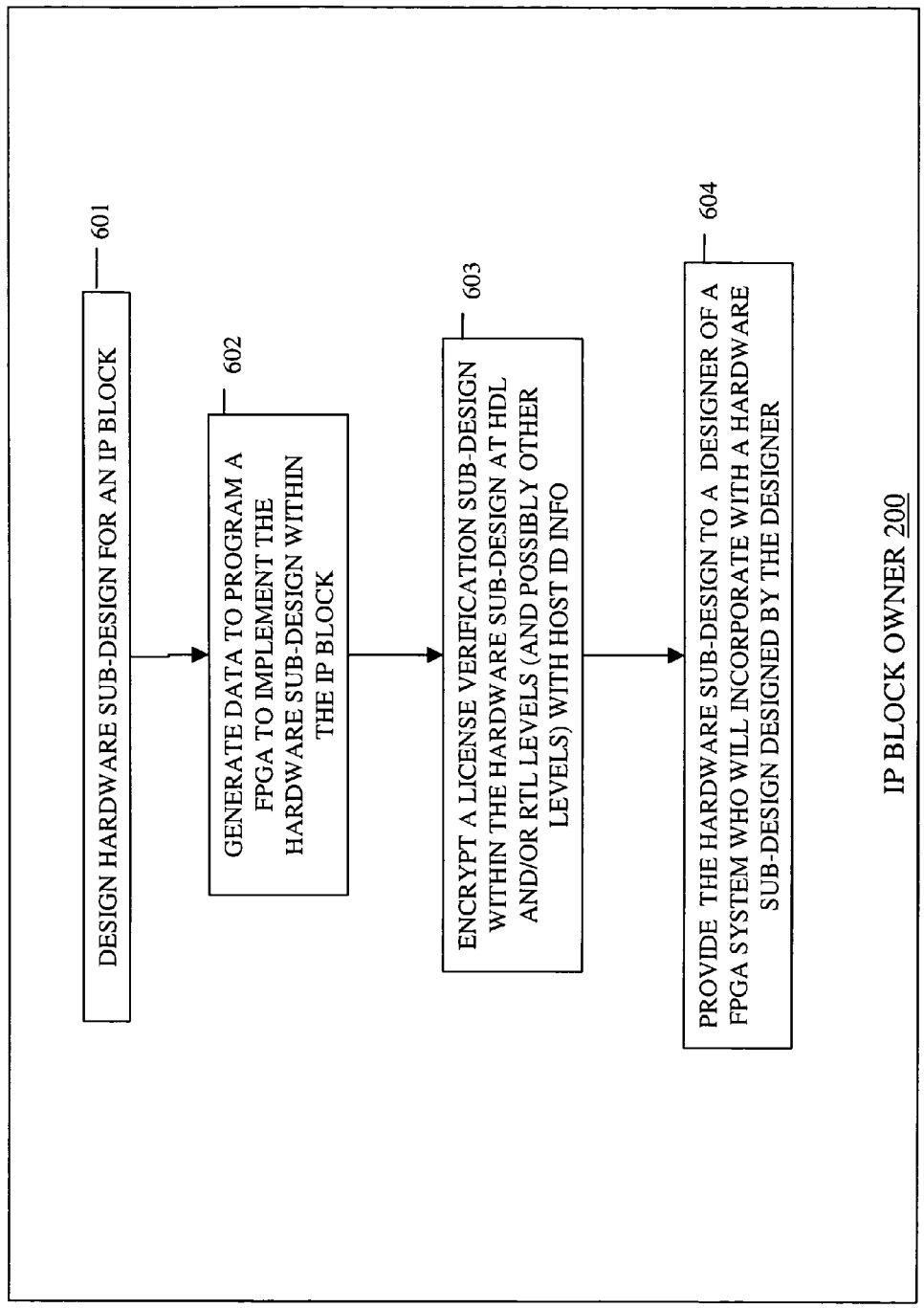
FIG. 6 is a flow chart illustrating encryption of a license verification sub-design within a hardware sub-design with a trusted host identifier at an IP block owner to prevent modification, according to one exemplary embodiment of the present invention.

FIG. 6 is a flow chart illustrating encryption of the license verification sub-design within a hardware sub-design with a trusted host identifier 245 at an IP block owner to prevent modification, according to one exemplary embodiment of the present invention. In operation 601, a hardware sub-design for an IP block (e.g., such as IP block 210A in FIG. 2A is designed by an IP block owner 200 as described previously in FIG. 2B). The hardware sub-design may be a design that was originally created by an IP block owner 200 in one embodiment. In another embodiment, an IP block owner 200 may own the hardware sub-design but the hardware sub-design originally was created by another company. In operation 602, data is generated to program a FPGA to implement the hardware sub-design within an IP block. A license generator 300 at an IP block owner 200 as described in FIG. 3 may be used to generate data to program a FPGA 218 to implement the hardware sub-design within one or more of the IP blocks 210A-210I as shown in FIG. 2A in one embodiment.

Next, in operation 603, the license verification sub-design within the hardware sub-design is encrypted at HDL and/or RTL levels and possibly other levels with host ID info (e.g., to ensure that the hardware sub-design provided by the IP block owner 200 only works on a particular FPGA having the trusted host ID 245 as described in FIG. 2A). Lastly, in operation 604, hardware sub-design information is provided to a designer 211 of an FPGA system who will implement the hardware sub-design provided by the IP block owner 200 into an FPGA 218 having the trusted host ID 245 as discussed in FIG. 2B, along with the designer's logic 250 that was separately developed. (e.g., the hardware sub-designs created by the designer such as the designer's logic 250 in FIG. 2A).

Figure 7:
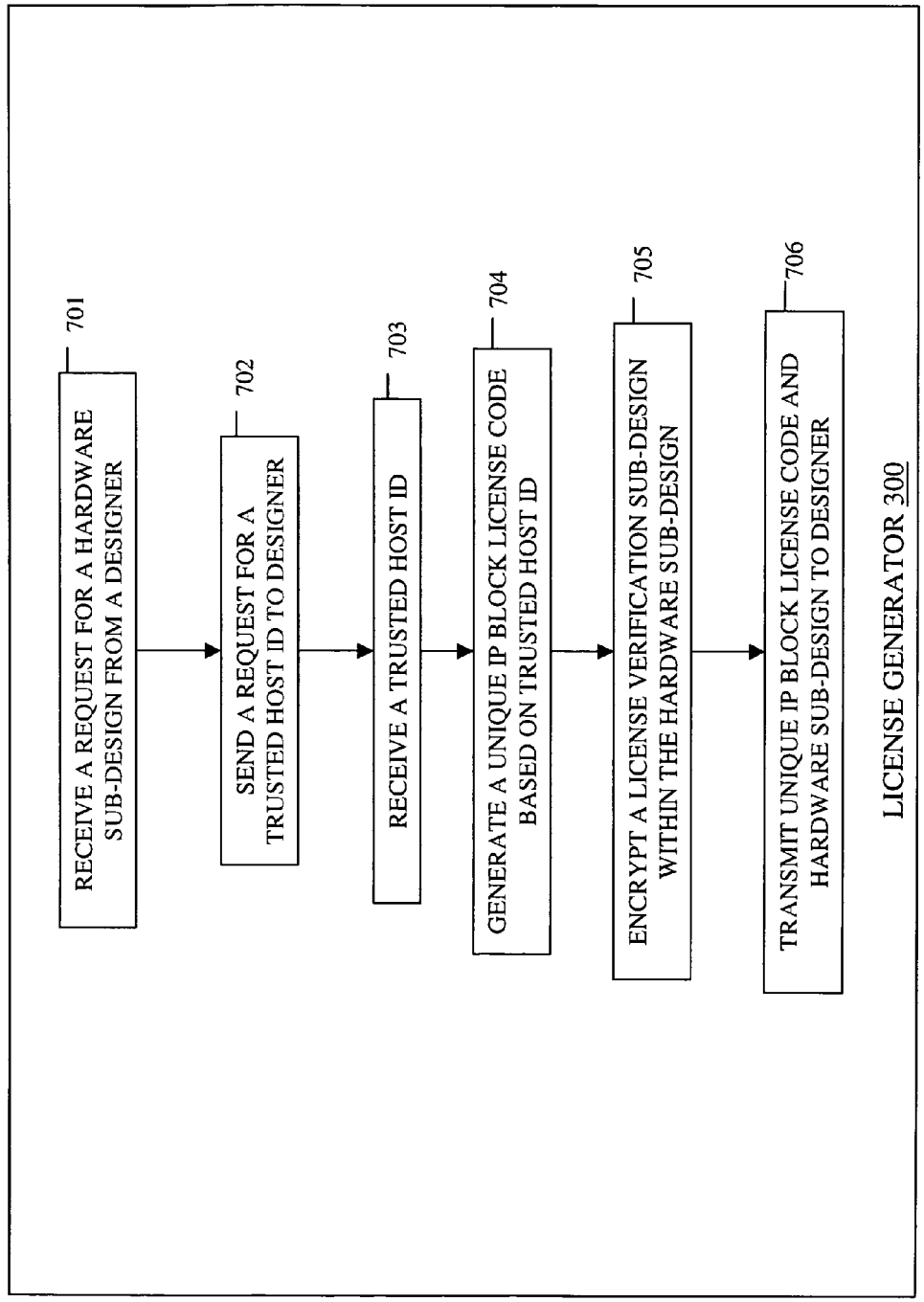
FIG. 7 is a flow chart illustrating the generation of a hardware sub-design license code by a license generator at an IP block owner after receiving a trusted host identifier from a designer, according to one exemplary embodiment of the present invention.

FIG. 7 is a flow chart illustrating the generation of a hardware sub-design license code by a license generator 300 at an IP block owner 200 after receiving a trusted host identifier 245 from a designer 211, according to one exemplary embodiment of the present invention. In operation 701, a license generator 300 receives a request for a hardware sub-design from a computer 311 at a designer 211. (e.g., the designer 211 may have entered into a contract with an IP block owner 200 to supply a hardware sub-design owned by the IP block owner 200). In operation 702, the IP block owner 200 sends a request for a trusted host ID 245 to a designer 211 (e.g., the request for a trusted host ID 245 may be sent by the IP block owner 200 to determine how much to charge the designer 211 for a particular license). In operation 703, a trusted host ID 245 is received from the designer 211. (e.g., so that the IP block owner 200 can generate a license to use the hardware sub-design only on a particular FPGA 218 having the trusted host ID 245).

In operation 704, a unique IP block license code is generated based on the trusted host ID 245. (e.g., a unique IP block license code may be generated by the license generator 300). In operation 705, the license verification sub-design within the hardware sub-design owned by the IP block owner 200 may be encrypted. In operation 706, a unique IP block license code and hardware sub-design is provided to a designer 211 from the license generator 300 at the IP block owner 200 (e.g., to fulfill the obligations under a contract between the designer 211 and the IP block owner 200 for example, as described in detail in FIG. 2B).

Figure 8:
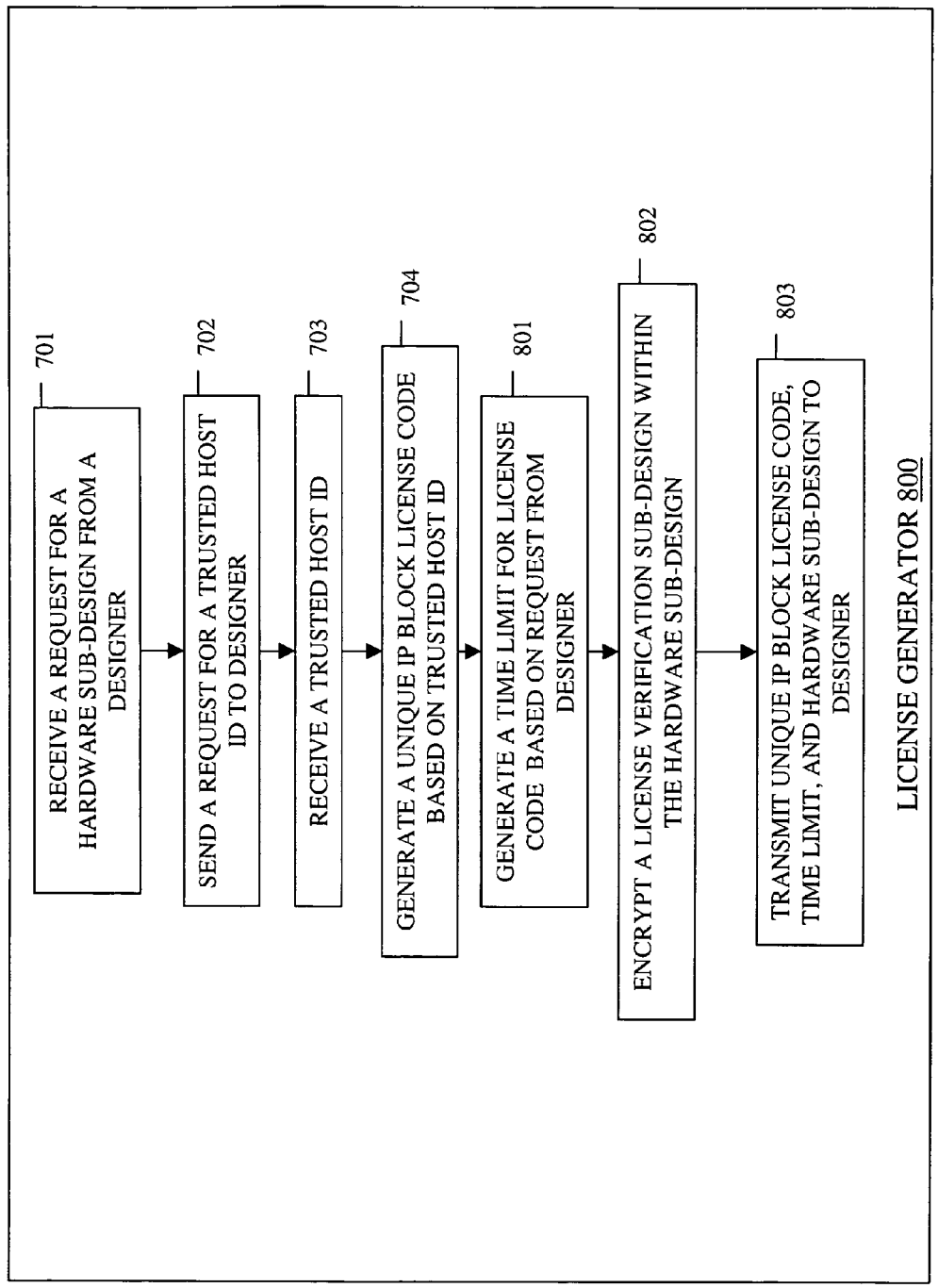
FIG. 8 is a flow chart illustrating the generation of a hardware sub-design license code having a time limit by a license generator at an IP block owner after receiving a trusted host identifier from a designer, according to one exemplary embodiment of the present invention.

FIG. 8 is a flow chart illustrating the generation of a unique hardware sub-design license having a time limit by a license generator 800 at an IP block owner 200 after receiving a trusted host identifier 245 from a designer 211, according to one exemplary embodiment of the present invention. FIG. 8 differs from FIG. 7 in that the license generator 800 additionally generates a time limit for a license based on a request from a designer 211 (e.g., a time limit for how long a particular hardware sub-design owned by an IP block owner 200 will operate and that is stored within clock circuit 525 as described in FIG. 5 and/or on an external hardware device). Operations 701-704 are exactly the same as previously described in FIG. 7. In operation 801, a time limit for a license based on a request from a designer 211 is generated. (e.g., the time limit may be based on how much a designer is willing to pay an IP block owner 200). In operation 802, a license verification sub-design within a hardware sub-design owned by the IP block owner 300 is encrypted to prevent modification, similar to operation 705 as previously described in FIG. 7. In operation 803, a unique IP block license having a time limit, and the hardware sub-design is provided to the designer 211. As such, FIG. 8 differs from FIG. 7 in that a time limit license based on a request from a designer is generated. Furthermore, a unique IP block license is provided to the designer 211 in FIG. 8 that includes the time limit.

The operations of the various methods of the present invention may be implemented by a processing unit in a digital processing system which executes sequences of computer program instructions which are stored in a memory which may be considered to be a machine-readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g., a server computer system) over a network connection. The instructions may be stored concurrently in several storage devices (e.g., DRAM and a hard disk, such as virtual memory). Consequently, the execution of these instructions may be performed directly by the processing unit. In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system. Furthermore, "Encryption" as used in this document refers to any mechanism that can be used to prevent modification by the designer of the portion of the sub-design involved in licensing. The hardware sub-design may for instance be pre-compiled into a binary database for which no de-compile is allowed.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
receiving, from a trusted host identifier provider, an integrated circuit having a trusted host identifier;

uploading, at a designer, a hardware sub-design provided by an IP block owner to the integrated circuit having the trusted host identifier; and enabling said hardware sub-design based on a validation of a trusted host identifier specific license received from the IP block owner with the trusted host identifier.

2. The method as in claim 1, further comprising:

uploading, at the designer, a non-encrypted circuit design to said integrated circuit having said trusted host identifier.

3. The method as in claim 1, wherein said trusted host identifier specific license is based on a group of trusted host identifiers.

4. The method as in claim 1, wherein said trusted host identifier specific license determines how long said encrypted circuit design will operate.

5. The method as in claim 1, wherein said integrated circuit is a field programmable gate array or an application specific integrated circuit.

6. A computer-implemented method of applying constraints to intellectual property within an integrated circuit based on a trusted host identifier, comprising:

generating, through use of a processing unit in a digital processing system at an IP block owner, a hardware sub-design for incorporation by a designer into the integrated circuit that includes the trusted host identifier;

generating, through use of the processing unit in the digital processing system at the IP block owner, a trusted host identifier specific license; and generating, through use of the processing unit in the digital processing system at the IP block owner, a license verification sub-design that enables said hardware sub-design by validating consistency of said trusted host identifier specific license with said trusted host identifier, wherein said hardware sub-design can only run for a specific amount of time on said integrated circuit having said trusted host identifier.

7. The method as in claim 6, further comprising:

providing, to the designer, the hardware sub-design, the trusted host identifier specific license, and the license verification sub-design; and wherein the hardware sub-design is to be incorporated by the designer into the integrated circuit along with another hardware sub-design that does not require a license.

8. The method as in claim 6, wherein said trusted host identifier specific license is based on a group of trusted host identifiers.

9. The method as in claim 6, wherein said trusted host identifier specific license determines how long said hardware sub-design will operate.

10. The method as in claim 6, wherein said integrated circuit is a field programmable gate array or an application specific integrated circuit.

11. A non-transitory machine readable storage medium containing a plurality of executable instructions, which when executed on a digital processing system cause said digital processing system to perform a method of applying constraints to intellectual property within an integrated circuit based on a trusted host identifier, said method comprising:

generating, at an IP block owner, a hardware sub-design for incorporation by a designer into the integrated circuit that includes the trusted host identifier;

generating, at the IP block owner, a trusted host identifier specific license; and generating, at the IP block owner, a license verification sub-design that enables said hardware sub-design by validating consistency of said trusted host identifier specific license with said trusted host identifier, wherein said hardware sub-design can only run for a specific amount of time on said integrated circuit having said trusted host identifier.

12. The non-transitory machine readable storage medium as in claim 11, said method further comprising:

providing, to the designer, the hardware sub-design, the trusted host identifier specific license, and the license verification sub-design; and wherein the hardware sub-design is to be incorporated by the designer into the integrated circuit along with another hardware sub-design that does not require a license.

13. A non-transitory machine readable storage medium as in claim 11, wherein said trusted host identifier specific license is based on a group of trusted host identifiers.

14. The non-transitory machine readable storage medium as in claim 11, wherein said trusted host identifier specific license determines how long said hardware sub-design will operate.

15. The non-transitory machine readable storage medium as in claim 11, wherein said integrated circuit is a field programmable gate array or an application specific integrated circuit.

16. An integrated circuit provided by a trusted host identifier provider, comprising:

a trusted host identifier;

a first hardware sub-design created by a designer and is enabled independent of said trusted host identifier; and a second hardware sub-design provided by an IP block owner that is enabled based on a validation of a license received from the IP block owner with said trusted host identifier.

17. The integrated circuit as in claim 16, wherein said second hardware sub-design is enabled based on a group of trusted host identifiers.

18. The integrated circuit as in claim 16, wherein a license verification sub-design within said second hardware sub-design is encrypted to prevent modification.

19. The integrated circuit as in claim 16, wherein said trusted host identifier is unique to said integrated circuit.

20. The integrated circuit as in claim 16, wherein said integrated circuit is a field programmable gate array or an application specific integrated circuit.

21. An integrated circuit having a trusted host identifier, comprising:

an encrypted circuit design provided by a third party IP block owner;

a licensing block that enables the encrypted circuit design based on a validation of a trusted host identifier specific license provided by the third party IP block owner with said trusted host identifier, wherein the trusted host identifier specific license is based on a group of trusted host identifiers of which said trusted host identifier is a part; and a clock circuit that determines how long said encrypted circuit design will operate.

22. The integrated circuit as in claim 21, wherein said integrated circuit is a field programmable gate array or an application specific integrated circuit.

23. The integrated circuit as in claim 21, wherein said clock circuit stores a countdown timer that determines how long said encrypted circuit design will operate.

24. The integrated circuit as in claim 21, further comprising an unencrypted circuit design that is enabled independent of said trusted host identifier.

25. The integrated circuit as in claim 21, wherein the trusted host identifier is a serial number that is built into the integrated circuit.

26. The integrated circuit as in claim 21, wherein the licensing block is encrypted to prevent modification.

\* \* \* \* \*